United States Patent [19]

Skutecki

[11] Patent Number: 4,628,455
[45] Date of Patent: Dec. 9, 1986

[54] CROSS AXIS TORQUE LIMITER FOR HELICOPTER AUTOPILOT

[75] Inventor: Edmund Skutecki, Glendale, Ariz.

[73] Assignee: Sperry Corporation, New York, N.Y.

[21] Appl. No.: 492,294

[22] Filed: May 6, 1983

[51] Int. Cl.⁴ .................. G06F 15/50; G06G 7/78
[52] U.S. Cl. ................................ 364/434; 364/433; 244/17.13; 244/182
[58] Field of Search ........... 364/427, 428, 433, 434; 73/178 R, 178 H, 178 T; 318/584; 340/946, 967, 970, 977; 244/17.13, 180–182, 194

[56] References Cited

U.S. PATENT DOCUMENTS

| | | | |
|---|---|---|---|
| 4,004,756 | 1/1977 | Gerstine et al. | 244/17.13 |
| 4,109,886 | 8/1978 | Tribken et al. | 244/17.13 |
| 4,129,275 | 12/1978 | Gerstine et al. | 244/181 |
| 4,168,045 | 9/1979 | Wright et al. | 364/433 |
| 4,385,356 | 5/1983 | Verzella et al. | 244/182 |

Primary Examiner—Gary Chin
Attorney, Agent, or Firm—Howard P. Terry; Arnold L. Albin

[57] ABSTRACT

A helicopter flight control system employs coupled torque limiters in the rotor cyclic pitch axis and collective pitch axis for airspeed and vertical path control, respectively. When the collective torque limit is reached, the cyclic pitch axis is automatically transferred to favor vertical path control. A synchronizer circuit is provided for assuring smooth acceleration transition to reduce accrued airspeed errors when the engine torque limit is no longer commanded.

12 Claims, 4 Drawing Figures

CROSS AXIS TORQUE LIMITER FOR HELICOPTER AUTOPILOT

BACKGROUND OF THE INVENTION

1. Field of the Invention

The present invention relates generally to automatic flight control systems for aircraft and more particularly to a system for helicopters for providing control of engine torque under conditions where the flight control system is demanding more power than the engine can safely supply.

2. Description of the Prior Art

Autopilot systems particularly adapted to use with helicopter flight control have been used as disclosed, for example, in the present assignee's U.S. Pat. No. 2,845,623 issued July 29, 1958 to G. E. Iddings and U.S. Pat. No. 4,109,886 issued Aug. 29, 1978 to E. R. Tribken, et al. The present system is concerned primarily with the control of the airspeed and the vertical path of the craft and hence involves the cyclic pitch control and the collective pitch control for commanding the pitch attitude of the craft and its vertical movement, respectively. Control of other axes are not herein addressed.

In many prior art autopilot systems, when it is desired to control both the airspeed and vertical path of a helicopter, the pitch axis is used to control airspeed modes while the collective axis is used to control vertical path modes. The aircraft may be caused to accelerate or decelerate by a change in pitch attitude, while changes in the collective control setting vary the vertical thrust of the rotor system, resulting in a direct increase or decrease in lift. However, an increase in collective demand will also result in an increase in the power being demanded of the aircraft's engines and transmission. Since operational upper limits are imposed by the manufacturer on the allowable output of the power plant, expressed as a developed torque limit, it is desired that neither manual nor autopilot inputs should command outputs in excess of these allowable limits.

It has been found that when flying at engine power settings near the maximum allowable limit, increases in collective setting in order to enter a climb or capture a desired altitude during a descent may cause the demands on the power plant to exceed the allowable limits. Thus, it has been the practice to monitor the developed engine torque so that the autopilot collective servo drive may be cut off if maximum torque is exceeded, or to actively monitor and manually limit the amount of torque which can be commanded. Unfortunately, this approach may adversely effect the vertical performance of the aircraft. For example, if the aircraft is being flown in the maximum power region while descending in an altitude preselect mode, the autopilot will be unable to arrest the descent and capture the desired altitude if either of the above techniques are used, either due to the fact of disabling the collective autopilot, or the inability to provide the required additional collective torque. Another approach has been to disable automatic collective control only at high speeds, thus flying vertical path modes with pitch axis control only, while keeping the collective torque setting constant. However, this approach has the undesirable result of permitting an aircraft to exceed its maximum allowable airspeed when a descent is commanded since the airspeed is no longer in a controlled loop mode. It is also clear that where the pilot is required to monitor engine torque instruments and override the autopilot in the event of an over-torque condition, particularly during changes in attitude, this will result in an excessive work load as well as a potentially hazardous condition.

SUMMARY OF THE INVENTION

The present invention overcomes the above described operational difficulties by providing torque limiting circuitry in the pitch and collective axes of a helicopter autopilot. The circuitry limits the amount of engine torque that the collective axis can command to a safe value. Further, when the collective axis is in the limiting mode, the circuit will automatically adjust the action of the autopilot pitch axis to control vertical errors. Thus vertical performance is minimally degraded when the torque limit is approached. The invention thereby allows the aircraft to be flown at maximum continuous power settings without exceeding the power plant or airspeed maximums during manuevors. Climb capability and altitude capture performance are not adversely effected by power plant limitations.

The above advantages are achieved in a flight control system for an aircraft having at least two independent channels of autopilot control and a predetermined maximum allowable engine torque by apportioning the torque between the two channels in response to error signals representing deviation of the craft from a reference provided for each of the channels. For each channel, the corresponding error signal is combined with an engine torque signal. When the maximum allowable engine torque is demanded, the command signals from both channels are further combined and directed to a preferred channel and the drive signal is diminished to the channel of secondary priority. Further, the channel assuming priority will also assume control of the correction for the partially de-energized channel.

In the preferred embodiment, the system is applied to the collective and cyclic pitch axes of a helicopter. Each axis is provided with a limiter circuit programmed to provide a predetermined maximum drive signal commensurate with the allowable engine torque. When the demand is below the maximum allowable torque, error signals are processed to the collective and cyclic pitch servo actuators without modification. When the collective command reaches the maximum allowable torque, any further increases in torque result in a decrease in collective command. A similar limiter is included in the pitch axis. As the engine torque limit is neared, the amount of pitch attitude which can be commanded by the airspeed path is gradually reduced to zero by the limiting circuit, while providing the required lift signal to the pitch axis to maintain the desired vertical path. Thus, when the torque limit is reached, the pitch axis no longer tries to hold airspeed but rather allows the airspeed to decrease as required to climb or level off at a new altitude.

The invention further comprises an airspeed synchronizer for minimizing abrupt changes in acceleration when transitioning between the torque-limited and non-torque-limited conditions.

DESCRIPTION OF THE PREFERRED EMBODIMENT

In the following description the present invention is applied to the flight control system of a helicopter. It should be appreciated that the stabiization and navigation of the craft are controlled by means of three primary manual control elements: pitch and roll attitudes are controlled by means of rotor cyclic pitch, yaw is controlled by an anti-torque rotor, and vertical thrust is controlled by rotor collective pitch. The cyclic pitch thereby also controls the airspeed of the craft. The present invention is concerned primarily with the control of the vertical path of the helicopter and hence involves only the collective pitch control and the cyclic pitch control. Thus, roll and yaw attitudes are not herein involved.

Figure 1:
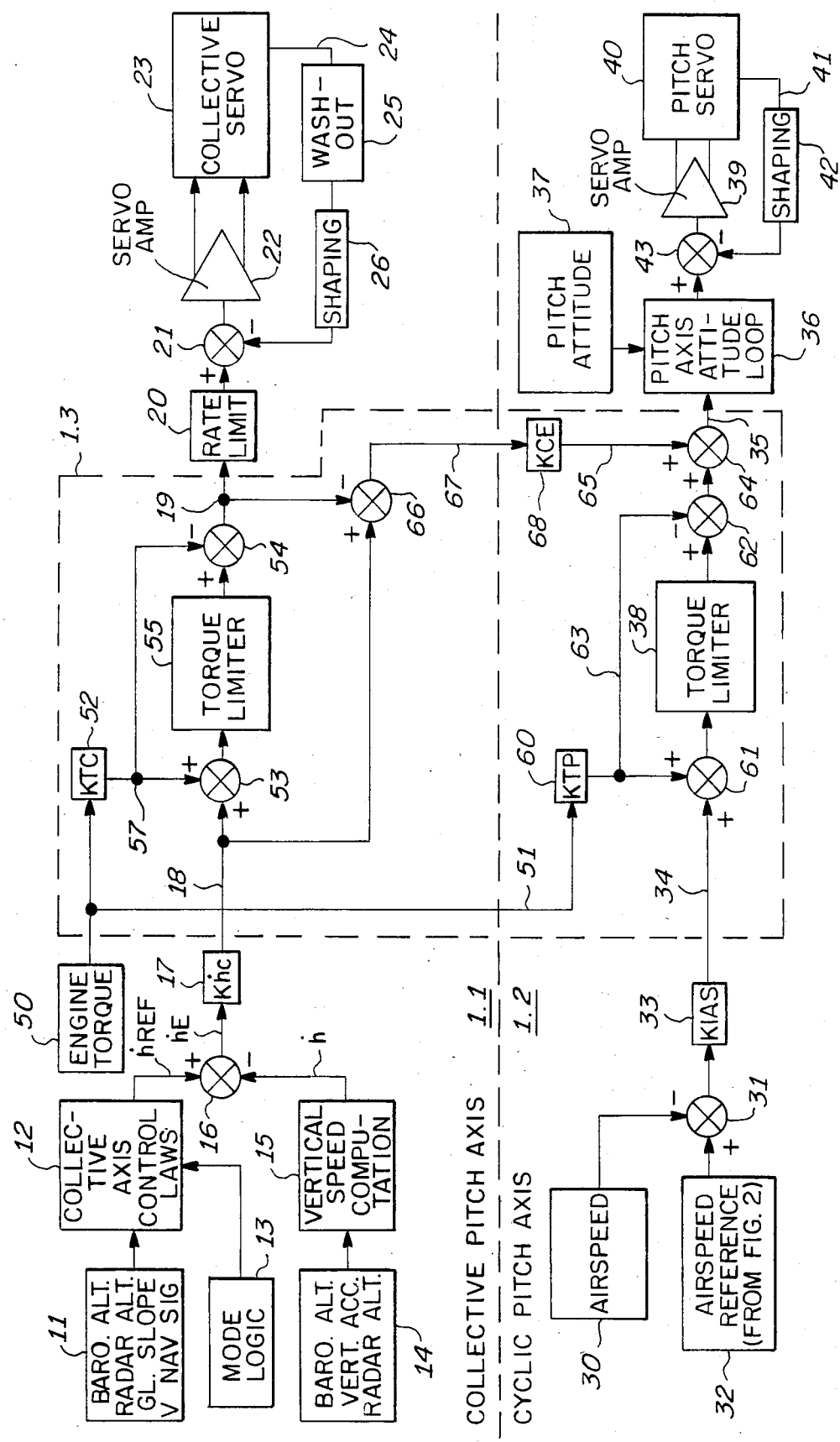
FIG. 1 is a schematic block diagram illustrating the control axes of a typical helicopter autopilot embodying the invention.

Referring to FIG. 1, there is illustrated a block diagram of a conventional autopilot system for the collective and pitch axes, wherein the present invention has been incorporated. Area 1.1 represents the collective axis control system, area 1.2 represents the pitch axis control system, and area 1.3 designates the torque limiting circuitry of the present invention.

Referring now to area 1.1, a pluarlity of sources of flight references 11 derived from craft altitude and navigational signals are provided to control law block 12 where the signals are combined and correlated as functions of the dynamic flight characteristics of the craft. The application of the control laws for selected modes of operation have been described in detail in Ser. No. 466,815, Three-Cue Flight Director System For Helicopters, filed Feb. 16, 1983, invented by the present inventor and C. Griffith, and filed in the name of the assignee of the present invention.

The autopilot may be used to control the helicopter in various modes of operation, including altitude hold, vertical speed hold, glide slope, and airspeed hold. These modes are established by the pilot through a conventional mode select panel shown at 13. Mode logic selector 13 which selects the desired altitude control mode is applied to block 12. As a result of processing the input signals selected in block 12, a vertical speed reference $h\cdot_{REF}$ is obtained. Altitude and vertical acceleration information 14 are applied to block 15 to obtain a vertical speed signal $h\cdot$.

Vertical speed computation block 15 is conventionally comprised of blending an altitude source and acceleration source together in complimentary high and low pass filters which filter out the high frequency variations characteristic of a barometric altitude signal and combine its long term or low frequency component with the high frequency vertical acceleration component to provide a relatively noise-free vertical speed signal. Conventionally, this is obtained by processing vertical acceleration and either barometric or radar altitude to obtain vertical speed. The vertical speed reference and vertical speed signals are algebraically summed in summing junction 16 to obtain a vertical speed error term $h\cdot_E$ which is gain scaled in block 17 to provide a collective position demand signal 18. This signal is processed through torque limiter circuit 1.3, the action of which will be described below. The output of torque limiter 1.3 is a collective command signal 19 which is coupled to rate limit circuitry block 20. Block 20 comprises conventional circuitry for limiting changes in the applied rate to the collective pitch servo actuator to assure that abrupt changes in vertical thrust do not exceed a rate which will cause discomfort to the occupants of the craft.

The rate limit 20 eliminates excessive acceleration or deceleration by making the system less responsive to transient vertical speed fluctuations such as may be caused by aerodynamic instability of the aircraft or a changing the vertical reference. The rate limit is varied according to the selected mode of operation. Thus, for example, under instrument flight rules, a more rapid response will be accepted to sacrifice occupant comfort for accuracy in navigation. The rate signal is applied through summing junction 21 to servo amplifier 22 which provides current to collective servo actuator 23. A servo position feedback signal 24 is processed through washout circuit 25 and shaping network 26 and coupled to summing network 21 where it is algebraically summed with rate limited signal 19. In a conventional manner, the collective servo amplifier 22 is driven by the error signal from the summing junction 21 until the desired rate is achieved, at which point the drive will be nulled out. Washout circuit 25 provides an integral control effect which attenuates any long-term residual vertical axis error to zero while passing relatively high frequency changes through to shaping circuit 26, wherein the bandwidth of the servo loop is tailored to assure stability over the desired operating range. Shaping network 26 provides displacement and rate feedback from the servo actuator 23 to servo amplifier 22 through washout circuit 25 and summing network 21 in a conventional manner.

Figure 2:
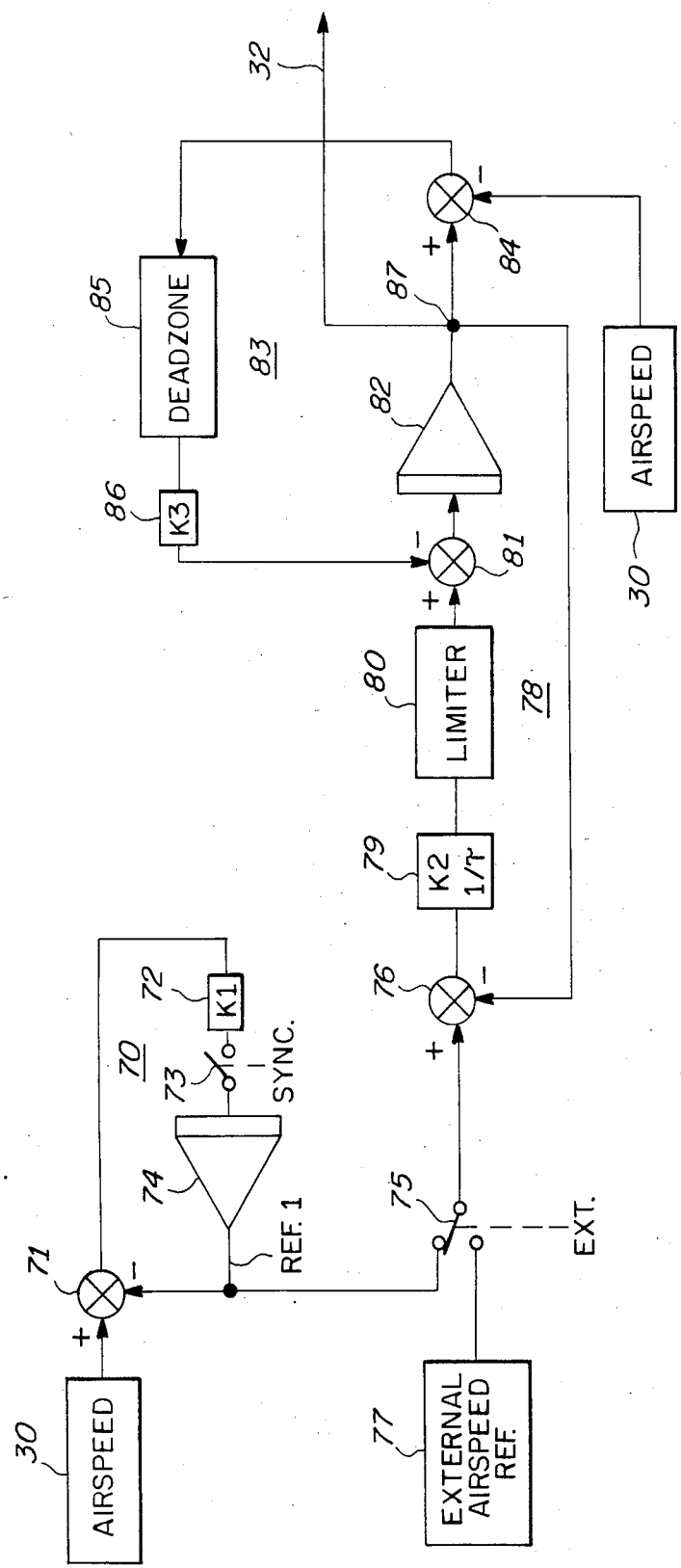
FIG. 2 is a schematic block diagram of an airspeed error synchronizer for use with the present invention.

Referring now to area 1.2 of FIG. 1, the cyclic pitch axis of the flight control system is shown therein. An airspeed sensor 30 provides a craft airspeed signal to summing junction 31. An airspeed reference signal 32 is also provided to summing junction 31 to create an airspeed error term by algebraically summing the craft airspeed signal with the airspeed reference. The airspeed reference signal is preferably provided from the synchronizing apparatus as shown in FIG. 2, to be described below. The airspeed error signal is further corrected by applying gain 33 to form a cyclic pitch demand signal 34. Pitch demand signal 34 is applied to circuitry in torque limiter 1.3 as will be described below. The output 35 of the torque limiter after passing through junctions 62 and 64 is a cyclic pitch command term which supplies pitch axis attitude loop 36. The pitch attitude loop attempts to hold pitch steady to a pitch attitude reference 37 which may be provided by a vertical gyro. This control loop conventionally blends the attitude command 35 with properly shaped pitch attitude 37 in order to drive the pitch servo loop. A pitch servo amplifier 39 drives the pitch axis servo actuator 40 thereby controlling the aircraft cyclic pitch. A servo position signal 41 is processed by shaping circuit 42 as in the collective pitch servo loop and fed to summing junction 43 where it is algebraically combined with the output of pitch attitude loop 36 to provide a signal for driving servo amplifier 39. It will be understood by one skilled in the art that the pitch axis of the autopilot may also employ an automatic trim actuator providing a slow, long term pitch control motion to center the servo actuator 40 near its midpoint of authority.

Figure 3:
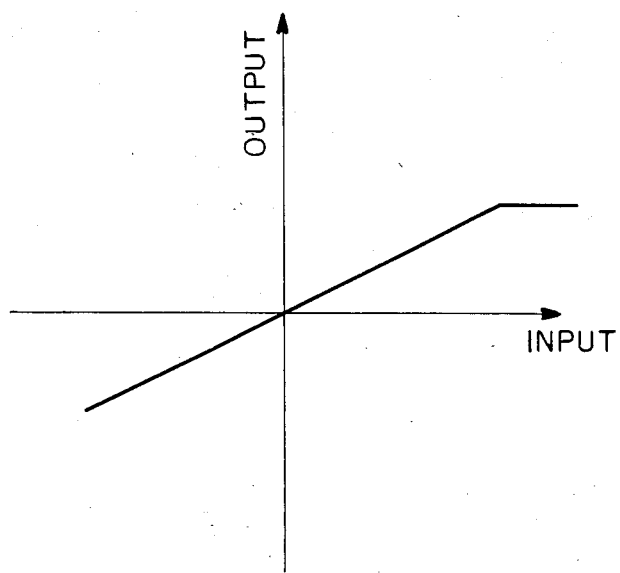
FIG. 3 shows a transfer function for the torque limiters corresponding to the block diagram of FIG. 1.

Referring now to area 1.3, the operation of the torque limiter circuitry will be explained. As shown in FIG. 1, the torque limiter circuitry operates on both the collective and pitch control axes. An engine torque sensor 50 which provides a signal 51 representing the developed engine torque is gain scaled by gain 52 and provided to summing junctions 53 and 54. The collective position demand signal 18 is supplied to torque limiter circuit 55 and combined with torque signal 57 through summing junction 53. The output signal 57 from gain 52 is also algebraically combined with the torque limiter output in summing junction 54 to provide an amplitude limited signal 19. Limiter 55 has a limiting threshold, as shown in FIG. 3, set to a value corresponding to a predetermined maximum allowable engine torque. It may be seen that since the signal 57 is added at the input of limiter 55 and subtracted at the output thereof, it has no effect on the output at 19 so long as the engine torque signal 57 remains below the limiting threshold $T_{MAX}$. Thus, for values of signal 57 below $T_{MAX}$, the value of input signal 18 is unaffected and appears at the same amplitude at 19. However, for values at or near the maximum allowable torque, limiter 55 will be saturated by the sum of signals 18 and 57. When the input to the limiter is sufficient to reach the threshold of limiting, which may occur when the maximum permissible engine torque has been reached and the collective axis is demanding additional torque, the dominant signal at summing junction 54 is that of the engine torque signal 57. Since this signal is applied in such a direction as to subtract from the collective drive, the result is to produce a feedback term to the collective servo which acts to reduce the demanded engine torque whenever the torque limit $T_{MAX}$ is exceeded. Note that under this circumstance positive values of position command 18 are not processed through the limiter 55.

Referring again to pitch axis 1.2 of FIG. 1, a similar torque limit circuit is included in the pitch autopilot channel. The engine torque signal 51 is gain scaled by gain 60 and thereupon coupled to summing junctions 61 and 62. Airspeed demand signal 34 is also summed at junction 61. The output of junction 61 is processed by limiter 38 in the manner described above for limiter 55. The output of limiter 38 is thereupon summed in junction 62 with engine torque signal 63. In a similar manner as described with respect to the collective axis, for values of signal 63 less than $T_{MAX}$, the output of summing junctions 61 and 62 is unaffected. Therefore, signal 34 will be processed directly through the summing junctions and the limiter to further summing junction 64. When torque signal 63 reaches $T_{MAX}$, any further increases in signal 63 are processed directly to summing junction 62 since the positive drive component of signal 34 is removed by limiter 38. The result is to provide a drive signal to pitch axis attitude loop 36 which has the effect of pitching the aircraft nose up when the torque limit is exceeded. One effect of pitching the aircraft up is to result in a climb, thereby reducing the amount of engine collective torque required to sustain a desired vertical path. More significant however is the elimination of the pitch attitude command signal 34 that is normally commanded as a function of airspeed error whenever the torque limit is reached; consequently, the pitch axis is no longer effective in maintaining airspeed when the maximum torque limit has been reached. Note however that a cross-feed signal 65 from collective axis 1.1 is also supplied to summing junction 64. The cross-feed term 65 is obtained by algebraically summing the collective position command signal 19 and demand signal 18 in summing junction 66. The resulting difference signal 67 which represents a vertical rate correction signal will be zero so long as the torque limit $T_{MAX}$ has not been reached, since the torque term is added at the input and subtracted at the output. Once $T_{MAX}$ has been reached however and the collective limiter is in saturation, then the difference signal 67 is provided which represents the difference between demanded and actual commanded collective drive, which corresponds to the vertical path error term resulting from failure to achieve altitude correction by the collective axis. This error term is scaled by gain 68 and summed into the pitch axis command signal from junction 62 at junction 64. It is clear therefore that when the maximum torque limit is reached any vertical error that cannot be controlled by the collective axis will automatically be transferred to and controlled by the cyclic pitch axis. When the aircraft has manuevered to a position such that the demanded power is below the torque limit, collective control will be regained and the pitch axis will transition back to airspeed control.

The operation of the airspeed synchronizer circuit of FIG. 2 to provide an airspeed reference to summing junction 31 of the pitch axis shown in FIG. 1 will now be explained. The primary function of the synchronizer is to provide a reference for the autopilot representing the airspeed error with respect to an established airspeed. When clamped to the established airspeed setting, it provides a reference which may be used to furnish airspeed error signals to correct for airspeed changes which may be allowed by the action of the torque limiting circuitry. Since the pitch axis is controlled by the altitude input and ignores airspeed whenever the torque limit is reached, very large airspeed errors may consequently develop. These large errors could result in undesirable and rapid airspeed accelerations when the vertical command is no longer at the limit of maximum allowable engine torque and airspeed control is resumed. To protect against these excursions, the airspeed error signal is processed in a novel manner as shown in FIG. 2. When unclamped, the circuit synchronizes with the craft airspeed, thus providing a reference which tracks airspeed changes preparatory to clamping the reference, and thereby introduces a zero-value error signal at summing junction 31 when the pitch axis autopilot is inoperative.

The airspeed synchronizer input integration loop 70 comprises a summing junction 71, gain 72, synchronizer control switch 73 and integrator 74. The above elements are applied as a feedback loop around algebraic summing junction 71. An airspeed signal 30, which may be derived from an airspeed sensor or navigational aid, is coupled to summing junction 71. The output of the junction is coupled to gain 72, which also introduces a delay or smoothing factor of approximately 0.5 seconds. The output of gain 72 is switched by control 73 which may be a manual control or logic actuated device, and thence to integrator 74. The output of integrator 74, denoted as REF. 1, is subtracted from airspeed 30 at junction 71 to provide an error feedback signal to loop 70. On initial power up or other pilot action resulting in a change in airspeed, synchronizer switch 73 is closed and the loop is unclamped. The integrator 74 will thereupon slew to provide an output at REF. 1 equal to airspeed 30, whereupon loop 70 will follow the airspeed input. When the autopilot is thereafter engaged, as in the speed hold mode, synchronizer switch 73 is opened.

Integrator 74 remains clamped at a fixed value equal to the established velocity which value is provided to switch 75. In the position shown in FIG. 2, switch 75 couples the REF. 1 output to summing junction 76. However, switch 75 may also be transferred to provide a signal from an external reference 77 such as might be provided by an external path computer. When coupled to airspeed 30, switch 75 provides a signal which corresponds to the craft airspeed at the time the synchronizer was clamped. The output of switch 75 feeds an error softening circuit including loop 78 which is comprised of summing junction 76, gain 79, limit amplifier 80, summing junction 81, and integrator 82. The purpose of the softening circuit is to attenuate large or rapid changes in the air speed reference, while allowing momentary deviations from the airspeed reference if the allowable torque limit is exceeded. The gain and rate limit stages result in the integrator 82 slewing at a low, comfortable rate, thus softening the effect of any commanded airspeed acceleration discontinuities due to changes in the airspeed reference signal. Gain 79 has a time constant typically set for a value of about 8 seconds. Limiter 80 limits the error drive amplitude or maximum rate of change at the input to summing junction 81. This rate limit is typically set at about 1 knot per second. The output of limiter 80 is fed through summing junction 81 to integrator 82. The output of integrator 82 is fed back to the input of summing junction 76 to close the loop and provide a lag in the conventional manner. As noted, the rate limit and lag time constants are selected to prevent large momentary airspeed reference changes, as might be encountered when changing modes or with attitude changes due to assumption of control by the collective axis, from affecting the operation of the altitude reference signal.

Figure 4:
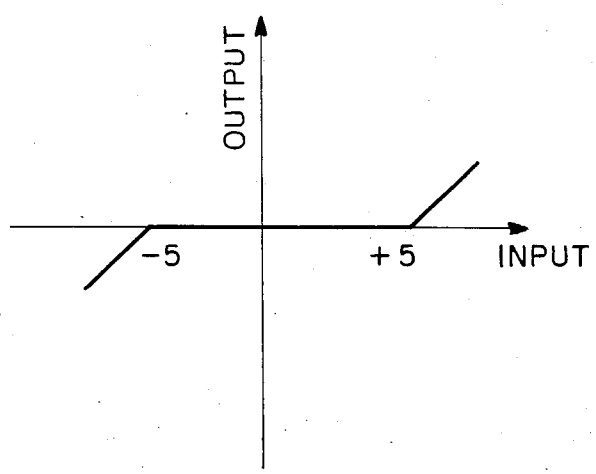
FIG. 4 is a transfer function diagram corresponding to the dead zone block of FIG. 2.

A third integration loop 83 includes the summing junction 81, integrator 82, summing junction 84, dead zone 85, and gain 86. The output of integrator 82 is fed to summing junction 84 where craft airspeed is algebraically subtracted therefrom to provide a second error signal. Thus, if the airspeed reference 32 is equal to the airspeed 30, no feedback error signal will be generated. However, when torque changes cause the collective axis to override the pitch axis autopilot, an error signal will be introduced into loop 83. Dead zone 85 receives this error signal. As shown in FIG. 4, for small airspeed errors of the order of ±5 knots, there is no output from dead zone 85, hence the output of integrator 82 remains uneffected. When the error signal from summing junction 84 exceeds the dead zone limit, the error signal is allowed to pass through gain 86 and thence to summing junction 81. The error output from summing junction 81 thereupon drives integrator 82 to a new value which must fall within approximately 5 knots of the actual airspeed. The output of integrator 82 at junction 87 is coupled to the cyclic pitch axis to provide airspeed reference 32 as shown in FIG. 1. It may be seen that in the case where the pitch axis autopilot has been deactivated by the assumption of control by the collective axis when the engine torque limit has been reached, thereby allowing a large airspeed error to develop, the airspeed reference provided to the system at summing jucntion 31 will follow within five knots of the actual error. When the aircraft flight path has been adjusted so that the torque limit is no longer commanded, the pitch axis control will transition back to the autopilot airspeed mode, and provide a progressive acceleration toward the moving airspeed reference which is now within approximately 5 knots of the actual airspeed. The value of the reference however, will continuously increase at a rate of 1 knot per second until integrator 82 approaches the original values set by the output of selector switch 75. Thus, the result is a smooth, comfortable acceleration to the original established airspeed.

The embodiment herein has been exemplified by an analog system for clarity. However, similar functions may be provided by software programming of a digital processor.

The advantages of the present invention may be observed by considering the following example, referring again to FIG. 1. Assume the pilot is flying in the vertical speed hold mode and airspeed hold mode simultaneously. A vertical speed reference of 1,000 ft/min. and airspeed reference of 170 knots have been set. Assume further that engine torque is at 90% of the maximum allowable torque. An error signal $h'_E$ from summing junction 16 is coupled to gain 17, and thence to junction 53. The engine torque signal 50 is processed through gain 52 and coupled to juncton 53. Since the sum of the engine torque signal 57 and the collective demand signal 18 are less than the maximum allowable torque demand, the signal from limiter 55 is passed to junction 54, where torque signal 57 is now subtracted, to provide collective command signal 19, which is essentially responsive to the input demand signal 18. Signal 19 then is coupled to limit 20 and thence to the collective servo actuator loop, which responds to signal 19 in the conventional fashion.

Since demanded engine torque is at 90%, collective commands are processed through the pitch axis limiter circuitry in a similar fashion.

The pilot now arms the altitude preselect mode at logic 13 and initiates a descent. As the desired altitude is approached, the collective actuator demands 100% torque in an attempt to arrest the descent. Since 100% torque is demanded, torque limiter 55 is now in saturation. Collective commands from signal 18 are attenuated by limiter 55 and the summation with engine torque signal 57 at junction 54. Therefore, collective command 19 now demands reduced torque, resulting in loss of autopilot altitude control in the collective axis. However, limiter 38 is also in saturation, resulting in signal 34 being attenuated in its passage through limiter 38 and junction 62, only the subtractive engine torque signal component 63 appearing at junction 64.

Further, the desired demand signal 18 is algebraically summed with developed command signal 19 at junction 66. The difference signal 67 represents the vertical path error due to collective torque limiting. After passage through gain 68 the error signal 65 is summed at junction 64 with an engine torque component from junction 62. Since the altitude demand signal 34 has been removed by the cyclic limiter circuitry, the cross-feed signal 65 directed to the pitch axis results in allowing the aircraft to pitch nose up sufficiently to correct the vertical path error, resulting in a climb or arresting the descent in capturing the desired altitude and thereby reducing the collective engine torque required to sustain the desired vertical path.

During this manuever, the airspeed has been reduced, for example, to 130 knots and torque is kept at 100%. The pilot now elects to again descend. He re-engages the vertical speed hold mode and selects a descent reference of 1,000 ft/min. Because of the reduced torque demand on the collective pitch axis, the collective autopilot reduces torque to 90% and the desired vertical speed rate is achieved. Control of the pitch axis autopilot is thereupon transferred back to the airspeed reference, which noses the aircraft down and commands an acceleration at 1 knot per second, until the desired airspeed of 170 knots has been reached.

While the invention has been described in its preferred embodiments it is to be understood that the words which have been used are words of description rather than limitation and that changes may be made within the purview of the appended claims without departing from the true scope and spirit of the invention in its broader aspects.

What is claimed:

1. A flight control system for helicopters having cyclic pitch means for controlling the pitch attitude thereof and collective pitch means for controlling the direct lift thereof, means for providing an altitude error rate signal corresponding to the algebraic difference between craft vertical speed and a vertical speed reference, means for providing an airspeed error signal corresponding to the algebraic difference of craft airspeed and an airspeed reference, and means for providing a signal representing developed engine torque, said torque having a predetermined maximum value, comprising:

first limiter means for receiving said altitude error rate signal and said engine torque signal and providing an altitude error rate signal limited to a predetermined maximum, and for providing a collective pitch command signal to said collective pitch means, second limiter means for receiving said airspeed error signal and said engine torque signal and providing an airspeed error signal limited to a further predetermined maximum, and for providing a cyclic pitch command signal to said cyclic pitch means, first algebraic summing means responsive to said altitude error rate signal and said collective pitch command signal for providing a vertical rate correction signal representing the difference between commanded torque and developed collective torque to said cyclic pitch means, and second algebraic summing means for receiving said vertical rate correction signal and said cyclic pitch command signal and conveying the sum of said vertical rate correction and cyclic pitch command signals to said cyclic pitch means, so that said cyclic pitch means responds only to said vertical rate correction signal and said direct lift is apportioned between said collective pitch means and said cyclic pitch means when said flight control system demands at least said predetermined maximum engine torque, and said collective pitch means and said cyclic pitch means are independently responsive to said respective altitude error rate and airspeed error signals when said demanded torque is less than said predetermined maximum.

2. A flight control system as set forth in claim 1, further comprising:

third algebraic summing means responsive to the algebraic sum of said altitude error rate signal and said engine torque signal for providing a collective pitch demand signal to said first limiter means, fourth algebraic summing means responsive to the algebraic sum of said limited altitude error rate signal and said engine torque signal for providing said collective pitch command signal, whereby said collective pitch means responds to said collective pitch command signal when said engine torque is less than said predetermined maximum, and said fourth summing means applies a reduced collective pitch command signal to said collective pitch means when said engine torque reaches at least said predetermined maximum value, fifth algebraic summing means responsive to the algebraic sum of said airspeed error signal and said engine torque signal for providing a cyclic pitch demand signal to said second limiter means, and sixth algebraic summing means responsive to the algebraic sum of said limited airspeed error signal and said engine torque signal for providing said cyclic pitch command signal, whereby said cyclic pitch means responds to said cyclic pitch command signal when said engine torque is less than said predetermined maximum, said sixth summing means applies a reduced command signal to said cyclic pitch means when said engine torque reaches at least said predetermined maximum value, and said cyclic pitch means is only responsive to said vertical rate correction signal when said engine torque reaches at least said predetermined maximum value.

3. A flight control system as set forth in claim 1, further comprising:

synchronizing means responsive to a predetermined airspeed signal for providing when in a clamped condition an airspeed reference signal to derive said airspeed error signal, said airspeed reference signal corresponding to a deviation in the airspeed of said craft from said predetermined airspeed, and for returning said craft to said predetermined airspeed, thereby reducing said airspeed error signal to zero, said synchronizing means also responsive to a craft airspeed signal for maintaining when in an unclamped condition said airspeed error signal effective zero during said deviation in airspeed.

4. The apparatus as set forth in claim 3, further including first switching means coupled to receive and provide a signal corresponding to said predetermined air speed signal for clamping and unclamping said synchronizing means.

5. The apparatus as set forth in claim 4, further including external airspeed reference means for providing a plurality of airspeed reference signals and second switching means for selecting at least one of said plurality of airspeed reference signals.

6. The apparatus as set forth in claim 5, in which said predetermined airspeed is derived from craft airspeed.

7. The apparatus as set forth in claim 5, in which said predetermined airspeed is derived from said plurality of airspeed reference signals.

8. The apparatus as set forth in claim 5, further including integrator means for continuously increasing said airspeed reference signal when in the clamped condition from a value representing approximately the craft airspeed until said airspeed reference signal equals a predetermined value.

9. The apparatus as set forth in claim 5 including level detector means responsive to the algebraic sum of said airspeed reference signal and said craft airspeed for providing a signal corresponding thereto when said sum exceeds a predetermined value.

10. The apparatus as set forth in claim 5 further including time delay means responsive to said predetermined airspeed for delaying the rate of change of said airspeed reference signal by a predetermined time constant.

11. The apparatus as set forth in claim 10, further including rate means responsive to said time delay means for limiting the rate of change of said airspeed reference signal to a predetermined value.

12. The apparatus as set forth in claim 10, including clampable integrator means responsive to said craft airspeed and to said first switching means for providing to said time delay means a predetermined airspeed reference signal when clamped and a variable airspeed reference signal when unclamped.

* * * * *